United States Patent [19]

Deo

[11] Patent Number: 5,720,033
[45] Date of Patent: Feb. 17, 1998

[54] SECURITY PLATFORM AND METHOD USING OBJECT ORIENTED RULES FOR COMPUTER-BASED SYSTEMS USING UNIX-LINE OPERATING SYSTEMS

[75] Inventor: Umesh Deo, Westerville, Ohio

[73] Assignee: Lucent Technologies Inc., Murray Hill, N.J.

[21] Appl. No.: 506,531

[22] Filed: Jul. 25, 1995

Related U.S. Application Data

[63] Continuation of Ser. No. 268,603, Jun. 30, 1994, abandoned.

[51] Int. Cl.[6] ........................................... G06F 12/00
[52] U.S. Cl. ............... 395/186; 395/187.01; 395/188.01; 395/614; 395/10
[58] Field of Search ......................... 395/186, 616, 395/614, 611, 612, 613, 187.01, 188.01

[56] References Cited

U.S. PATENT DOCUMENTS

| | | | |
|---|---|---|---|
| 4,621,321 | 11/1986 | Boebert | 365/186 |
| 5,032,979 | 7/1991 | Hecht et al. | 364/DIG. 1 |
| 5,235,642 | 8/1993 | Wobber et al. | 380/25 |
| 5,263,157 | 11/1993 | Janis | 395/600 |
| 5,265,221 | 11/1993 | Miller | 395/725 |
| 5,276,901 | 1/1994 | Howell et al. | 395/800 |
| 5,315,657 | 5/1994 | Abadi et al. | 380/25 |
| 5,335,346 | 8/1994 | Fabbio | 395/601 |
| 5,355,474 | 10/1994 | Thuraisngham et al. | 395/600 |
| 5,440,739 | 8/1995 | Beck et al. | 365/650 |
| 5,450,593 | 9/1995 | Howell et al. | 395/650 |
| 5,574,912 | 11/1996 | Hu et al. | 395/650 |

OTHER PUBLICATIONS

"A Security Model for Object–Oriented Databases", Fernandez et al., Security and Privacy, 1989 IEEE Symposium, Jul. 1989.

"A Model for Evaluation and Administration of Security in Object–Oriented Database", Fernandez et al., IEEE Transactions on Knowledge and Data Engineering, vol. 6, No. 2, Sep. 1990.

*Primary Examiner*—Thomas G. Black
*Assistant Examiner*—Hosain T. Alam

[57] ABSTRACT

A security platform, for stand-alone or networked processors using UNIX or similar operating systems, limits access to system resources, including software and hardware, by personnel using the system and by other resources within the system. The platform implements a rules-based naming and rule convention for types of access of security interest to one or more served application programs, providing rule sets each of which associate an access type with a subject and, optionally, one or more objects to which are compared access demands made by the served application to the platform in the same form as the rule sets to determine whether the access demanded is permissible. Internal platform security is provided by limiting users who can modify the platform and its resident rules.

16 Claims, 5 Drawing Sheets

FIG. 1

FIG.2a
VALIDATION OF ACCESS DEMAND

SECURITY PLATFORM AND METHOD USING OBJECT ORIENTED RULES FOR COMPUTER-BASED SYSTEMS USING UNIX-LINE OPERATING SYSTEMS

This is a continuation of application Ser. No. 08/268,603 filed Jun. 30, 1994, now abandoned.

This invention relates to a security platform which limits resource access for computer-based systems using stand-alone or networked processors and a UNIX- or similarly-based operating system.

PROBLEM

UNIX is an operating system architecture and environment for processors in computer-based systems having a variety of applications. The ability of a system user to gain access to data in the system, provide data to the system, cause the system to operate, or manipulate the operation of the system or its hardware and software components, and otherwise use the system in some fashion is a consideration for any systems designer.

Integrity of operation is provided by limiting the number of users who can use and modify operating resources. Examples of operating resources are (a) an application suite which collects divisional financial information and aggregates and rationalizes the information to produce a corporate financial picture, and (b) a report prepared by an application. Integrity of data is provided by limiting the number of users who can input and/or modify data. Examples of users are, for example, (a) individuals, (b) an applications program, for instance in the context of that application working in conjunction with another application program or data base, and (c) another system resource, for instance a keyboard at a specific workstation in the network. So, in the forgoing example, each piece of financial information comprises a piece of data which may be stored in a database memory and/or operated on by an application. Confidentiality of results is provided by limiting users to whom the system, or some part thereof, is available, or for whom certain results are displayed or reported. Continuing with the example, this could mean that only a limited number of users could access a financial report generated by the application suite or stored in memory or access the financial information in a resident database.

In a networked environment, security is established at three levels: within the operating system, within the networking software, and within the applications programs in the system.

In present computer-based networks, a variety of security measures are used in a UNIX operating system environment to achieve system integrity and confidentiality. These measures include user identifications, passwords, read permissions, write permissions, and executable permissions. Typically, the administration and checking of each security measure is coded in different places within the UNIX system environment and each security measure uses different designs, algorithms, encoding, and storing/sorting mechanisms from any other.

Within the UNIX operating system, conventional access types are "read", "write" and "execute". For the three access types, there is only one level of security for the system. There is no domain within another domain, meaning that if a user is permitted—has access—to read data, access is not limited to only specific data, all data can be read. Consequently, the user is not able to partition the system at this level. If, for example, a user wished to share selected information with a customer, this would require that the selected data be placed on a separate system to avoid the customer accessing data which the user did not wish to share. While a custom security routine overlaying the applications of interest to the customer may provide a solution, the user remains at risk that his customer may attempt to avoid the restrictions by entering through the operating system.

In the present security environment, to add security measures to a new application, or to add a new security check to a currently existing security measure requires substantial system evaluation and development work due to the various security measures with diverse programming techniques, coded and scattered throughout the system, and the need to confirm that each possible operational combination which exercises or relies on a security measure or check continues to provide the desired access while denying only undesired access.

The primary responsibility of applications developers is to produce a product which will properly operate within the system architecture and function to consistently manipulate data and produce reliable results consistent with the program goal. Applications security is a secondary developer responsibility which can divert the developer from his primary responsibility, with the likelihood of this increasing as the amount of custom coding to produce desired security features increases.

Even where security features are part of an application, the end user must manage their implementation. This requires an understanding of each aspect of security feature functionality. Because system usage and users are dynamic, this understanding must extend beyond initial security feature implementation to subsequent modification to recognize and implement user-specific needs and to encompass system changes and user changes.

With a single processor functioning in a system, security is difficult; advancing to the next technological step, that is, to a networked system containing multiple processors, adds to the difficulty. Each processor, and the networking software, must be taken into consideration in designing and testing security measures.

There is therefore a need for a security platform which will adapt to a variety of applications programs, provide a uniform system-wide security capability, which makes the system and its resident applications more secure, which simplifies incorporation of desired security features for applications, which handles networked environments with facility, and which allows implementation and modification of security measures easily and quickly.

SOLUTION

The above problems are solved and an advance is made over the prior art in accordance with my invention wherein a security platform is incorporated as part of the system to operate on top of the operating system and network.

From a security and programming standpoint, my invention is flexible, easy to specify, easy to implement, and easy to test.

My invention implements a rules-based methodology for specifying security of which the following terms form the basis:

Entity Type—the basic object type that will be used to define a security feature for a particular application. Examples of types of entities are: "user"—a person; "link"—a physical connection for communicating in the network; or "lazerprinter"—a piece of equipment which is resident in the system.

Entity Name—the name of a particular entity belonging to an entity type. For the above examples of Entity Types, examples of Entity Names could be: "John" belonging to type "user"; "dkToStarlan" belonging to type "link"; "LazerPrinter1" belonging to type "lazerprinter".

Class—a collection of entities of the same type. For example, within the set of all users is the subset of all users in the finance department. Thus, a user "Class" could be designated as "Finance". Or, an equipment "Class" could be designated as "Printers".

Class Type—the type of all entities belonging to that class. For example, in dealing with users, a class type could be the "Group" designation, e.g.,the Finance group, the Engineering group or the Personnel group. As another example, a class type could be the "Peripheral" designation, e.g., the Printer peripherals, the Telecommunications lines, or the Display screens.

Super Class—super class of an entity is the class to which the entity belongs. Super class of a class is the class that is a proper superset of the class. The super class of an entity or a class has the same type as the entity or the class. For example, "Equipment" could be the superclass for all peripherals in the system, "Staff" could be the superclass for all groups of users. "All" is the superclass of any entity and any class of any type.

Subject type (of Access)—an entity type for which an operation is being performed. An example of subject types is "user".

Object Type (of Access)—an ordered n-tuples of entity types on which or with which an operation is being performed, essentially the system resources. Examples of system resources and object types are "wordprocessingApplication", or "displayscreen", "printers", or "database1", each of which can be involved in accomplishing an operation on behalf of a user. Where more than one entity makes up an object type, each can be referred to as an object and collectively referred to as the objects.

Access or Access Type—an identified usage of the system or its resources to which rule-based relationships between Subject Types and, optionally, one or more Object Types are applied. Broadly speaking, "access" indicates a type of usage of a particular system resource or a particular combination of system resources. The complete set of available accesses are predefined for an application and are not subject to system/security administration. Access is any parameter which the developer determines is worthy of separate consideration. For example, typical accesses or access types used in conventional systems are "read", "write", "execute", and "report". An application may introduce some new and unconventional access like "loginAllowed", which may be expressed in the following form:

Access Demand—a demand through an application served by the security platform to determine if access will be granted. The application will structure the demand in the form "AccessType(subject, object)" utilizing information made available to it, for example, by the command entered defining the requested access; the identification of the requesting entity (which can be, for example, a user or a system resource such as a workstation or communication line); and the series of entity types making up the object, that is, the system resources on which or with which the operations will proceed if access is granted.

LoginAllowed(user,(link, destination)).

In my invention, the set of accesses is a subset of the set of all possible relations in the application between entity types. However, not every relation is an access. My invention provides the capability for the application designers to define which relations they wish to have as accesses. Once defined, only the operations associated with those relations will require permission of the security feature within that application.

For example, in the "loginAllowed" example above, several relations are possible in the cross-set (user, link, destination). A designer may use one of them to indicate that a certain combination of user, link and destination is defined as "loginAllowed" and this combination will permit login. Another relation example might be called "canSendReport" which may be used to indicate that certain combinations of user, link and destination will allow the specified user to send a report to the specified destination via the specified link. While there are other potential relationships between user, link and destination, only these two defined accesses may be of concern in developing security for an application within the system and thus the only two for which access is checked and hence defined in the security platform.

In defining rule-based relationships, Object type is optional. An access may not have an object type. For example, if the only security concern is whether a person attempting to use the system is a qualified user, it is important only to define access in terms of that user, specifically that user's membership as or in an entity, class or superclass and it is irrelevant to address system resources. For example, in this instance, access relevant to only users without regard to system resources can be defined by the access type "isEmployee" and the subject type "user" so that to determine if the individual is a member of a group as a precursor to permitting that user access to any system resource, the rule relationship is "isEmployee(user)".

Security Rule—an instance of access. With the preceding definitions, a developer can define any activity involving the system as an access and then develop one or more rules which shows the security relationship between a subject type and an object type for that access. For example, if the developer wanted to trigger some level of security at the time an attempt is made to log onto the system, the access would first be defined in terms of the subject type and object types involved in logging on. For example, the access could be defined as "LogInAllowed" (user, link, destination). For this, a security rule would be written in terms of the possible users, links and destinations existing for the system. For example, if we wanted to provide a user named "John" access to the system by a phone line identified as "phnlnl" into a workstation destination designated as "StnA", the rule can be written: LoginAllowed(John,(phnlnl, StnA)).

Access Class—a collection of accesses. The concept of access class is not significant in terms of establishing a security feature, but is included for the purpose of easy administration of security within an application. For example, assume that the system administrator wishes a user, "John", to be able to do every operation within the application on the system except be able to perform the operation "Delete". By providing an access class which is defined to include accesses to all operations other than "Delete", and identifying it as "All-but-Delete", the administrator can provide the following rule regarding John's access: All-but-Delete(John, all). Without the Access Class capability, the system administrator would have to write a large number of rules to achieve the same result.

Security Context of the Entity Type—the context in which an entity type may be used to define an access. It may either be the "subject" or the "nth object" where n is the relative position of the entity type in the ordered n-tuples that make up the object type for that access. For example, the entity type "user" is in the first position or subject of the accesses "administerUser(user, user)" and "administerLink(user, link)". By so stating the rule, it is clear that only users can administer users, user-classes, links or link-classes.

Secure Universe—the collection of all the entity types, entity names, entity classes, accesses and access classes defined for an application.

Secure Domain—any collection of entity types, entity names, entity classes, accesses and access classes that is consistent (access can be determined in every case).

By implementing this terminology and approach, my security platform permits access for a subject to an object if a rule is found for (a) the access type; or (b) an access class to which the access type belongs, which defines access between (A) either (i) the subject or (ii) a superclass to which the subject belongs and (B) either (i) the object or (ii) a superclass to which the object belongs.

My invention provides a developer a reference location to define access types for a program; a location to define operations which manage and allocate the security platform; and a vehicle for updating each processor in the network. My invention further provides a location to collect all rules relating to access. My security platform recognizes that all security measures can be written in rules-based format as access types and by doing so create uniformity in defining and implementing security measures. My security platform provides a location for defining only those access types of interest from a security perspective for an application suite and provides a location in which the rules relating to the defined access can be stored. It also provides a process for updating the network so that the rules are uniformly applied for the application suite within the network as well as tools—programs which act on the rules to manage and update the resident rules, including a location to store existing tools and add additional tools.

In accordance with one aspect of the invention, a security platform is provided which works on top of the operating system, and the network and becomes part of the applications software.

In accordance with another aspect of the invention, the security platform administers and checks all access types in the system.

In accordance with another aspect of the invention, rules are established and implemented at both a class level, encompassing a defined class of users or resources, and at the level of the individual user or resource within the class.

In accordance with a further aspect of the invention, the security device supports secure domains within the system which permits the user to segment data and resources in the system to provide a user access to only a portion of the data or use only a portion of the system resources, or permit an application to act on only a portion of the data in the system.

In accordance with another aspect of the invention, the security rules can be written and updated on-line without the need to recompile, reboot, or relogin.

In accordance with a still further aspect of the invention, the security platform can be transported from one system to another and reused for differing access types and applications by only defining or redefining the appropriate relationships between access types, users and resources.

In accordance with another further aspect of the invention, the security platform can substitute for the security resident in the operating system and networking software either by turning off the security provided by the operating system and networking software and implementing the instant invention as the security for the system or by incorporating the security platform into the operating system or networking software themselves.

DETAILED DESCRIPTION

General Security Platform Definition and Requirements

Figure 1:
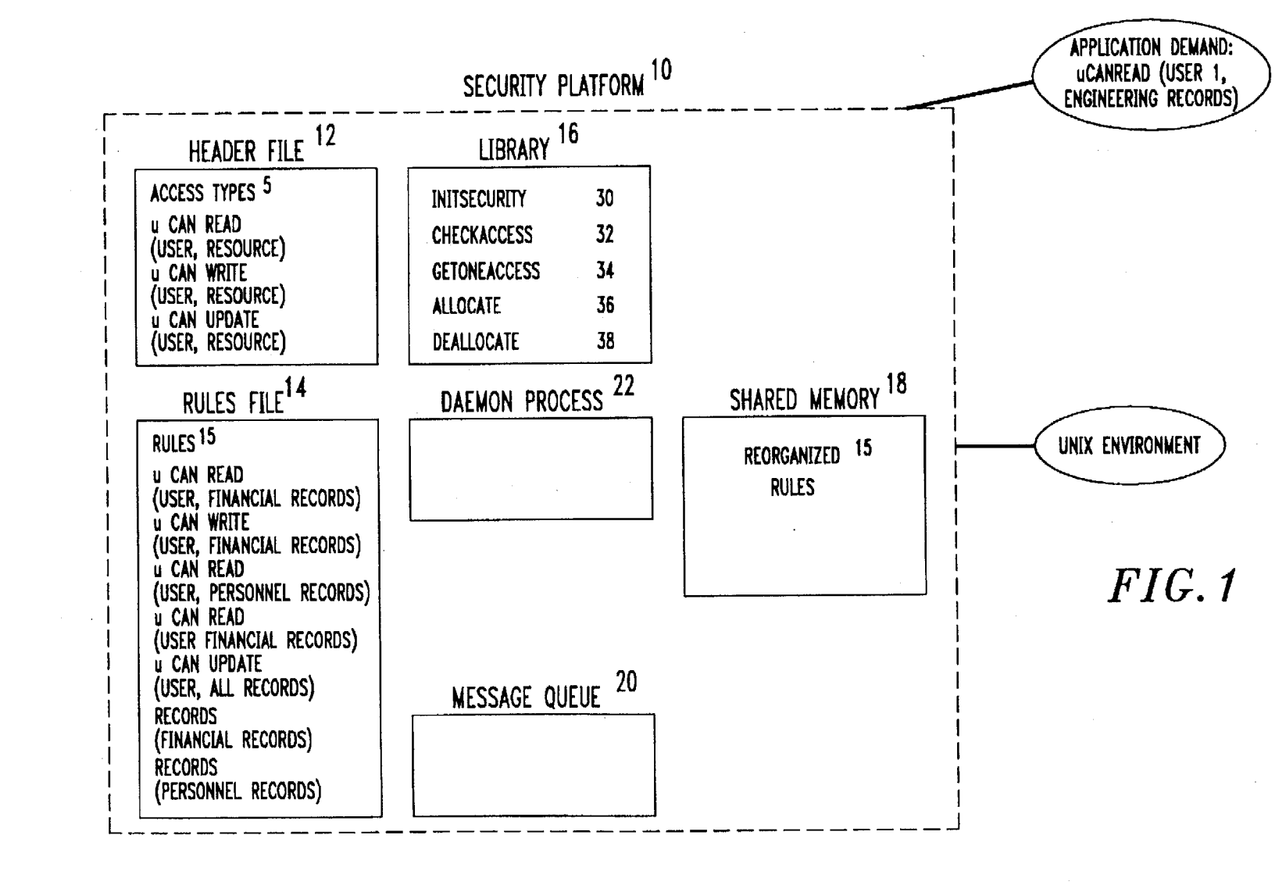
FIG. 1 is a diagram of the primary components of the security platform.

As shown in FIG. 1, my invention is a security platform 10 which is accessed by an application program in a computer-based network. The platform has the following primary components, a header file 12, a rules file 14, and a library 16. In the preferred embodiment, additional components, notably a shared memory 18, a message queue 20 and a Daemon process 22 are implememented to improve efficiency and to provide a level of security within and for the security platform itself.

The general environmental needs of the preferred embodiment of the security platform are: C language compiler; UNIX, or other UNIX-like operating system which allows shared memory appropriate hardware that allows enough shared memory to accommodate all the security rules. The platform is not otherwise hardware or software dependent.

The security platform 10 in its most basic form is a framework or tool which requires only that access types 5 having security interest be defined in header file 12 for the application under consideration; that rules 15 consistent with the access type naming convention relevant to each access type populate the rules file 14; and that the application under consideration contains the appropriate trigger into the platform to access and initiate validation of access by security platform 10.

Header File—Access Types and Naming Conventions

Header File 12 defines access types. In its raw form, header file 12 defines no access types but does provide an example as a reminder of the definition convention. All access types 5 defined in the header file will take a rule-based form "AccessType(subject type, object type)". This lends itself readily to each application for which security measures are to be implemented. Access types 5 in Header File 12 can be modified or deleted or new access types added based upon the perceived needs of the application under consideration.

For example, a developer may wish to define the following access types 5—uCanRead, uCanWrite, uCanUpdate, and uCanProcess, which could have the following meanings, respectively: access "uCanRead" deals with the ability to read information stored within the network; access "uCanWrite" deals with the ability to transport information resident in the network to a printer or modem for communication beyond the network; access "uCanUpdate" deals with the ability to enter information into the network for storage, manipulation or commentary; and access "uCanProcess" deals with the ability to manipulate information resident in the network. Obviously, many other types of access can be defined and a broad type of access (a class of access) can be more narrowly divided into accesses. For example, uCanWrite may be a super class of access divided into two more specific classes—uCanWritePrinter which could deal with the ability to print out information from the network utilizing one or more printers making up part of the network, and uCanWriteModem which could deal with the ability to utilize a modem comprising part of the network to transmit information outside the system.

The header file 12 establishes how access rules are written for the defined access types 5. In the preferred embodiment, the convention used for defining access types 5 is to name the access type and follow it with a parenthetical identification of a subject and an object. "Subject" and "object" do not necessarily represent a specific individual or single resource.

Thus, in structuring the definition of each access type, the following convention is adopted:

AccessType(Subject, Object)

and for an composite object:

AccessType(Subject,(Object1, Object2))

and for a class of subjects:

AccessType(SubjectClass,Object).

For the example of the access type, the definition may be:

uCanAccess(user,resource)

Rules File—Population of Access Rules Based on Access Type Definition

Within the structure imposed by the convention for defining access types 5, the access types 5 are sufficiently broad to permit a variety of rules to be written conforming to the access type while segmenting the access in a hierarchical fashion among users, classes of users, resources and classes of resources. Thus security is provided at a macroscopic level and microscopic level and can be implemented accordingly for an application. For example, the access type "uCanUpdate" can have in Rules File 14, rules 15 which define that a specific user is entitled to update both financial and personnel records by having two separate rules 15 defined in the rules file 14:

uCanUpdate(User1, FinancialRecords)

uCanUpdate(User1, PersonnelRecords)

Rules file 14, alternatively, can contain a single rule defining a class of resources which encompass both types of records, which could, for example be named "AllRecords" and thus only a single rule 15 need appear in the rules file 14 in addition to the rules which define membership in the class of AllRecords:

uCanUpdate(User1, AllRecords)

The advantage of this is that rules can be established on a class basis, then on a specific resource basis for which classbased rules are inappropriate.

As long as a more specific rule does not conflict with the more general rule, both can exist and act as valid security controls. A user or a resource inherits permissions of its antecedent hierarchy.

Rules file 14 can be populated at any time by rules 15, however, it is anticipated that the rules file 14 is populated by rules 15 formulated consistent with the access definitions in Header File 12, by an application installer and/or application administrator. By properly identifying the installer and/or application administrator as having access to modify the rules, my invention will permit the installer or application administrator to write rules into, delete and change existing rules 15 in rules file 14.

Rules File 14 is the repository for all security rules 15. To improve response time, rules file 14 and resident rules 15 are not accessed during an access security validation process. Instead, the rules 15 are initially read into shared memory 18 by InitSecurity 30 and kept resident in shared memory 18 as a non-persistent copy of each rule 15.

Executables—Allocation and Deallocation of System Memory to Create Shared Memory and Message Queue Two executables also comprise a part of the platform. An allocate executable 36 allocates and initiates shared memory 18 and message queue 20 during system start up. As noted above, shared memory 18 is a segment of system memory into which rules are read and kept as a non-persistent copy of the rules 15 from the rules file 14 at the time of system start up by the InitSecurity function 30. Subsequently, shared memory 18 is the location in which rules are accessed as part of access security validation. This is done because the Initsecurity function 30 reorganizes the rules 15 at the time of their deposit in shared memory 18 into a more efficient pattern to speed up the process of comparing rules 15 against the access demand by the checkAccess function 32. A deallocate executable 38 deallocates the shared memory 18 and message queue 20 during system shutdown.

Library—Validation routines and related processes

The library 16 contains defined functions within the security platform 10 which maintain and manage the rules 15 in the rules file 14. In the preferred embodiment, two primary functions and one secondary function are resident in library function 16—"initSecurity ()" 30 and "checkAccess ()" 32, and secondary function "getOneAccess ()" 34 each of which will be subsequently discussed.

checkAccess—the validation process of access demand against access rules.

Figure 2A:
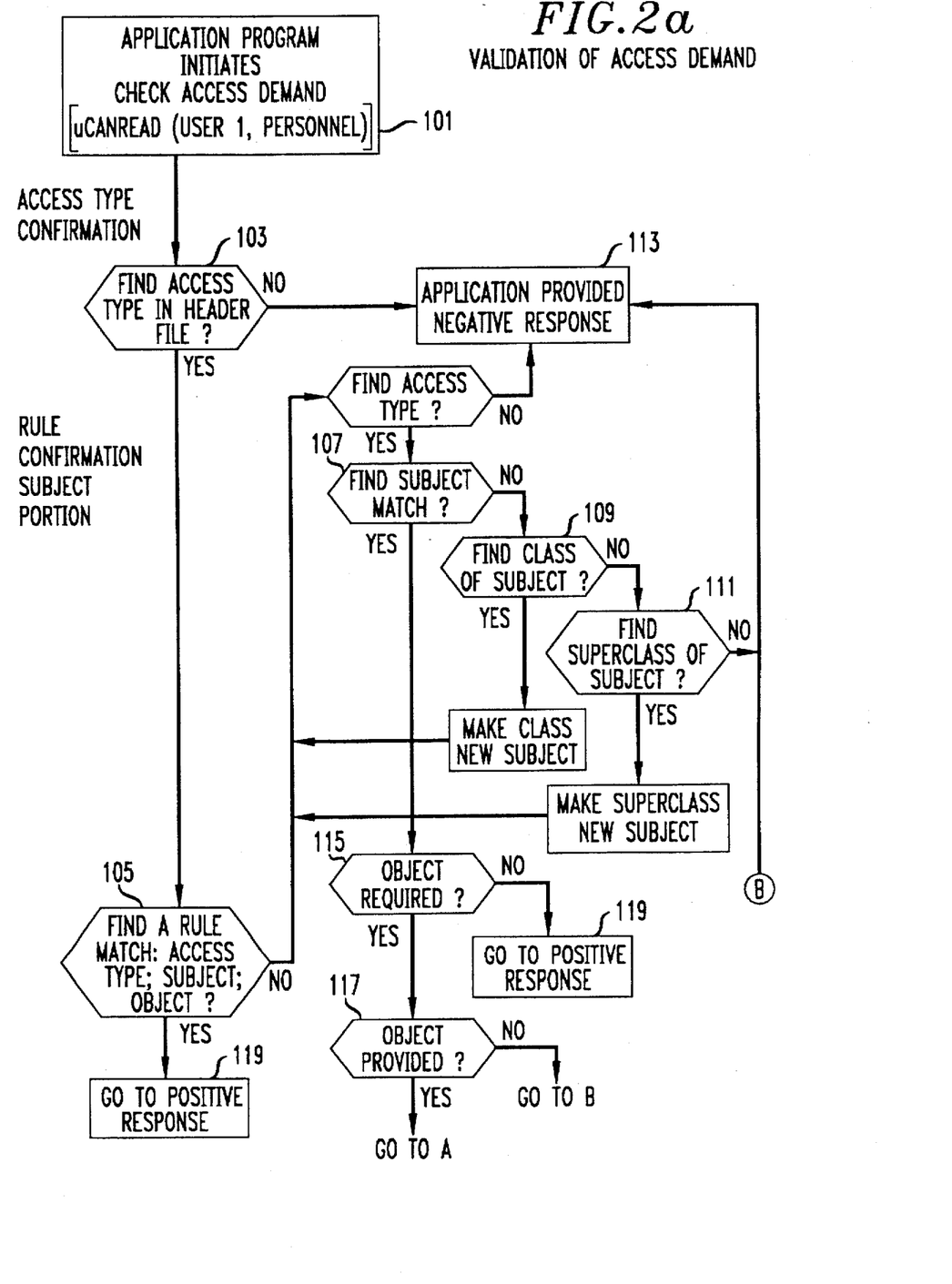
FIGS. 2a and 2b are a flowchart of the process of access validation performed by the checkAccess process of the security platform.
Figure 2B:
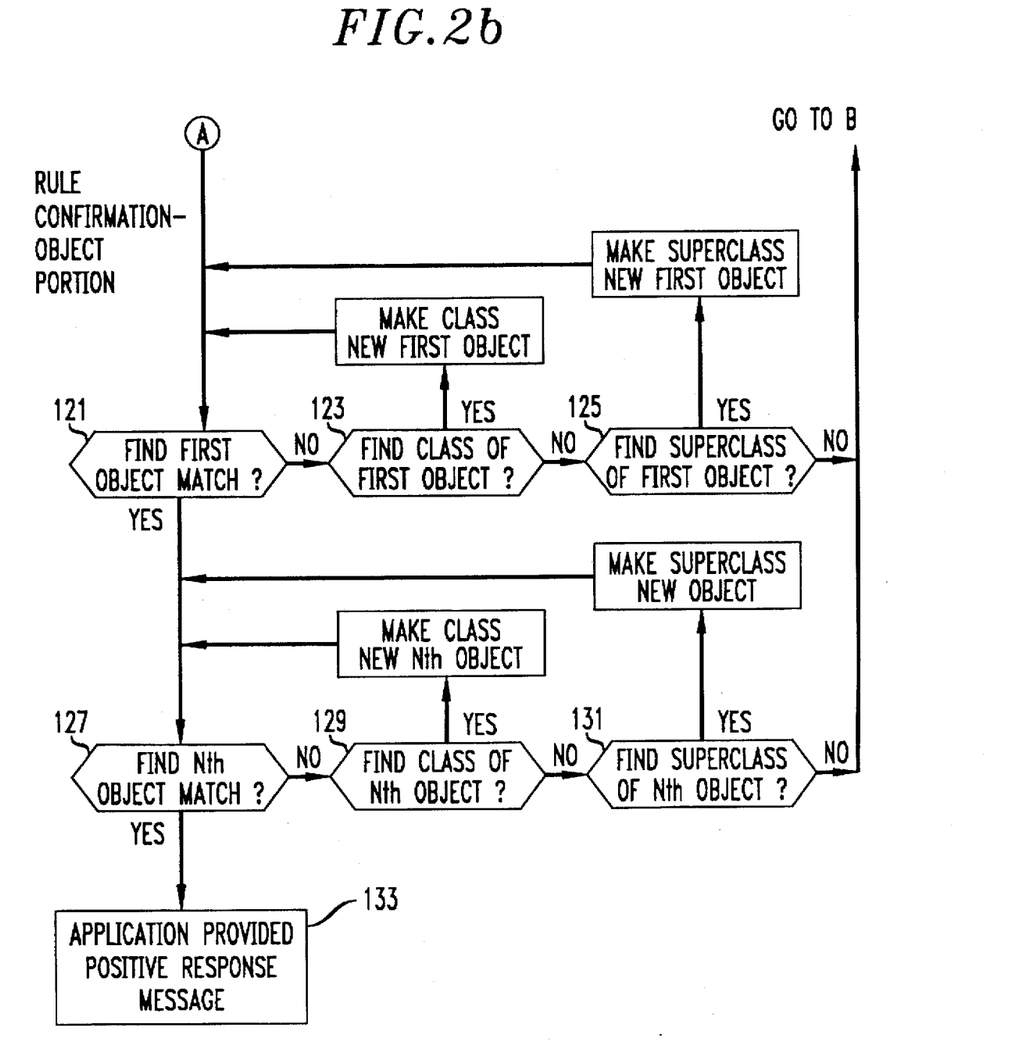

The library function checkAccess 30 is initiated by a served application making an access demand for a particular type of access in the form "AccessType(subject,object)" with the need to define the object being optional in certain instances and, in other instances, the object portion of the demand may comprise more than a single entity, i.e., the demand taking the form:

AccessType(subject,(object,object, ... )) As illustrated in the flowchart of FIGS. 2a and 2b, the validation process within CheckAccess 30 takes the access demand forwarded from the application and initiates the check access process (101) by first confirming that the access type exists in the header file (103). If no match exists, the application is provided a negative response message (105). If a match exists, checkAccess 30 takes the subject portion of the access demand and attempts to match the demand against rules 15 taken from Rules File 14 and residing in shared memory 18 in reorganized form. The validation process of CheckAccess 30 looks for a specific match at the subject/entity level for a matching access type matching rule subject/entity (107); if none is found, the validation process determines to which class(es) the subject/entity belongs and cascades to determine if an equivalent rule exists at the class level (109); then determines the superclass(es) to which those classes and subject/entities belong and checks for an equivalent match at that level (111). If no match is found and all rules have been checked, the application is provided with a negative response message (113).

If the checkAccess 30 process finds one or more acceptable rules with subject matches or equivalents, the process determines if an object is required (115) and whether one is provided (117). If no object is required, a positive response message is provided the application (119). If an object is required and provided, checkAccess 30 process looks for a specific match at the object/entity level for the first object/entity among the accepted access type subject selections (121); if none is found, the validation process determines the class(es) to which the object/entity belongs and cascades to determine if an equivalent rule exists at the class level (123); then determines the superclass(es) to which those classes and object/entities belong and checks for an equivalent match at that level (125). If no match is found and all rules have been checked, the application is provided with a negative response message.

If a match is found, the process then continues to search for matches among those access types, subjects and objects remaining from the previous match selections for the remaining n objects at the object/entity level (127); then the class level (129); and finally the superclass level (131). If no match is found and all rules have been checked, the application is provided with a negative response message. If a match is found, the process is complete and a positive response message is sent to the application (133).

initSecurity—the process of establishing a framework of virtual components initSecurity 30 at the time of system start up checks that shared memory 18 is allocated and that it is properly owned, controlled and accessed by the respective appropriate group or individual users. Further, InitSecurity 30 reads the contents of the rules file 14 into shared memory and assembles the rules 15 into a hierarchy based on access type 5, subject, and object. It then calculates the location of pointers to be used by checkAccess 32 in facilitating the ability of CheckAccess to rapidly access specific rules by bypassing rules not in the proper hierarchy branch.

getOneAccess—the process of selecting all permissible objects for a subject/user for an access type.

GetOneAccess 34 is a secondary process within library 16 which when initiated by a demand identifying an access type desired and the subject for the access rule will search shared memory and select all permissible objects for the given access type and for the given subject. This function is useful when, for example, the user wants to display a list of allowable objects for an access type. This provides a self-monitoring capability to the platform since a user can verify whether the access desired is provided for. If it is not, for example, because the user has not been included among the users identifed in the access rules, the user then can arrange to have the rules modified or updated to provide proper access. Likewise, it provides a method of disclosing how access rules have been written for the specific application at hand, allowing modifications and additions consistent with the rules.

Message Queue and Daemon Process—Security within the platform itself

My invention recognizes that security must extend within the security platform as well as encompass the applications software to which it provides protection. This is appreciated and accomplished by limiting the persons who can alter the security platform and its rules. Consistent with UNIX nomenclature, the user "root", that is, one or more administrators for the security platform, are afforded access to all security components of the security platform, notably all objects and all access types. The security platform also permits identification of users who can modify less than all components, notably only rules which relate to specific system resources. Both users are referred to a user administrators. Further, the application prevents alterations of the security platform by more than one user administrator at a time. Once a user administrator commences alteration of the security platform resident on a processor, other user administrators are not permitted access to that security platform until the alterations by the initial user administrator are completed through a message queue 20 and a Daemon process 22.

Figure 3:
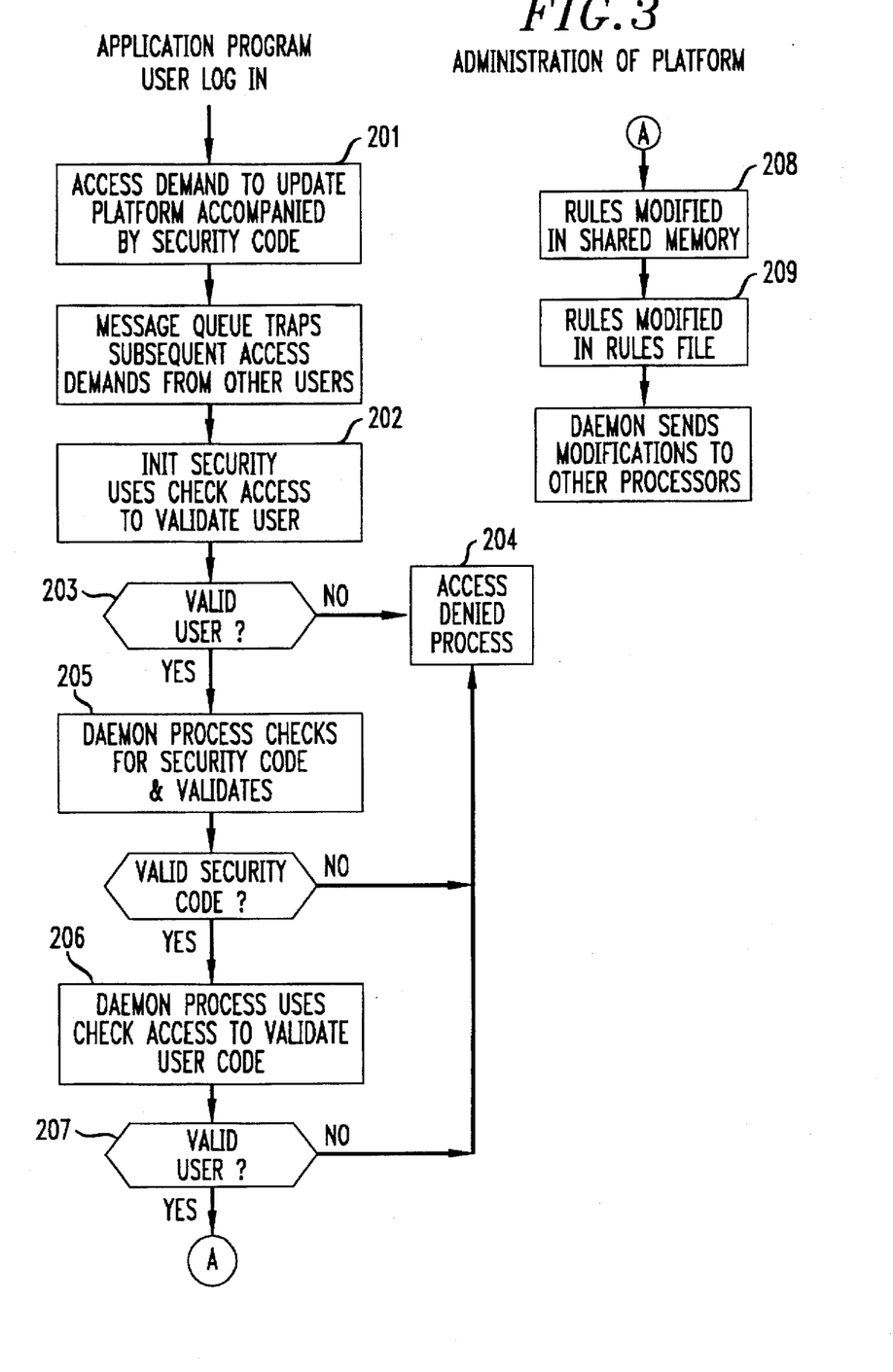
FIG. 3 is a flowchart of that portion of the initSecurity process involving validation of the user as having authority to update the security platform components, notably the rules in the rules file.

As shown in FIG. 3, when a user is identified to the security platform (201), initSecurity 30 performs a validation process (202) to confirm that the user is among the user administrators who, for the particular application, are allowed to do administration on the specified users, entities or classes in the security platform. This is accomplished by treating this as an access demand which initiates checkAccess 32 and the process, described above, is undertaken to determine if the identified user falls within an access rule. If the validation process does not find the user (203) among those allowed to do administration on the identified users, entities or classes, the process will not send any changes to the daemon process 22 to update rules 15 in rules file 14 (204). If a match is determined, the daemon process checks for a security code (205) in the message provided by the served application. If the security code is not provided, the daemon process will log a security breach and ignore the message from the user. If the daemon process 22 finds the security code, the daemon process will duplicate the initsecurity 30 user validation, again using checkAccess 32 (206).

If the second security access check performed by the daemon process qualifies the user (207), the user's input will be processed through the message queue 20 by daemon process 22 which modifies the non-persistent copy of the rules 15 in shared memory 18 (208) and the persistent copy of the rules in rules file 14 (209).

Figure 4:
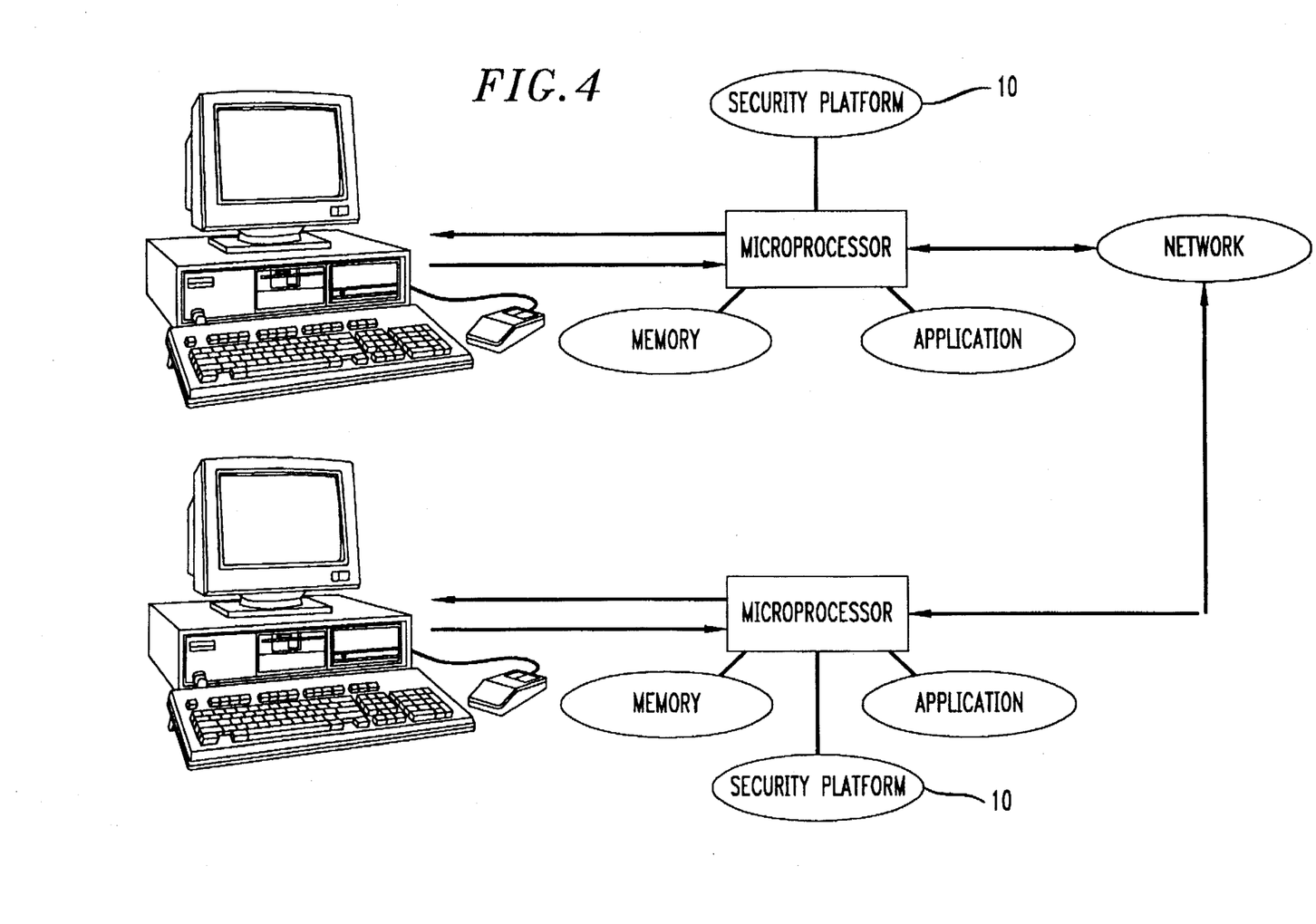
FIG. 4 is a schematic of a networked system in which the security platform is a part.

Once the daemon process 22 has updated the rules file 14 resident on the processor to which it is also the resident daemon process, the daemon process then sends the update (210) through the message queue 20 into the network and on through receiving message queues and daemon processes for each other processor in the network which then update the rules file and shared memory for their respective processor. In this manner, the shared memory 18, the rules files 14 and hence the security throughout the network are kept consistent. During any administrative updating of rules, message queue 20 prevents any other user from updat45ing the security platform until the first user has completed the update in progress.

As can be seen, my invention need not be referenced by an applications package, but may be as easily implemented as part of or by the operating system software or as part of or by the network software.

The above description is only of one preferred embodiment of the invention. Numerous other arrangements may be devised by one skilled in the art without departing from the scope of the invention. The invention is thus limited only as defined in the accompanying claims.

I claim:

1. A security platform for a UNIX-based system comprising:

at least one rule, each rule directly defining a type of access in terms of subject, a subject being an entity type for which access is permitted by the rule and which encompasses users, system resources and other entity types, and two or more objects, an object being the entity types to which the access relates in the order listed and which encompass users, system resources and other entity types;

means for comparing requested access by an entity type, requested access being defined by an access demand which identifies the access type of interest and defines that access type in terms of subject and objects, to the defined at least one rule to determine if requested access is permitted based upon the correspondence between the terms making up the requested access with the terms defining the at least one rule; and means for providing a positive response when access is permitted and a negative response when access is not permitted.

2. The security platform of claim 1, wherein the comparing means determines if the access type identified in the access demand is the same as the access type of the at least one rule, and if no match exists, determines that access is not permitted;

if a match exists between the access demand and the at least one rule, determines if the subject of the access demand is the same as the subject of the at least one rule with which the access type matched, and, if no match exists, determines that access is not permitted;

if a match exists between the access demand subject and the subject of the at least one rule with which the access type of the access demand matched, determines if the first object of the access demand is the same as the first object of the at least one rule with which the access type and subject matched, and, if no match exists between the first objects, determines that access is not permitted;

if there exists a match between the first objects, continues to attempt to find matches through the nth object of the access demand and the nth object of the at least one rule, and if no match exists for any object, determines that access is not permitted; and if all n objects for the access type match all n objects in the at least one rule, determines that access is permitted.

3. The security platform of claim 2, wherein the comparing means determines for any unmatched subject of the access demand if a rule exists within the platform which defines the unmatched subject as a member of a group of subjects, a class, and determines if the class is the subject of the at least one rule with which the access type matched that of the access demand, and if the class is not the subject, determines that access is not permitted, and if the class is the subject, accepts the class as a match for the any unmatched subject.

4. The security platform of claim 3, wherein the comparing means determines for any unmatched object of the access demand if a rule exists within the platform which defines the unmatched object as a member of a group of objects, a class, and determines if the class occupies the object position in the at least one rule with which the access type, subject and preceding objects match that of the access demand, and if the class does not occupy the object position, determines that access is not permitted, and if the class does occupy the object position, accepts the class as a match for the any unmatched object.

5. The security platform of claim 4, further comprising: a rules file in which a persistent copy of the at least one rule is kept;

shared memory in which a non-persistent copy of the at least one rule is kept; and wherein the comparing means searches the shared memory for the at least one rule.

6. The security platform of claim 5, further comprising:
means for limiting modification of the platform to properly authorized users including defining the request to modify the platform as an access demand in which the user is identified as the subject of the access demand and the comparing means determines if at least one rule matches the access demand and permits access.

7. The security platform of claim 6 in which the means for limiting modifications also includes validating a security code.

8. The security platform of claim 7, further comprising:
a daemon process which modifies rules in the shared memory and in the rules file consistent with the input from a properly authorized user; then sends the modifications to any other daemon process in the system;
a message queue which accepts all messages input to the platform related to modification of the platform and which keeps any other user's input from the daemon process until the daemon process has completed modifying rules consistent with the input from the immediate authorized user.

9. A method for limiting access within a computer system having a UNIX-like operating system to provide security therefor, comprising the steps of:

specifying each type of access of interest by an identifier;

defining, for each type of access of interest, at least one rule which identifies the access type by the identifier and specifies access in terms of a user for which the access of interest is defined as permitted and two or more system resources to which the access of interest relates in the order listed in the rule;

accepting an access demand sent by a user which identifies the access type of interest, and demands access in terms of the user for which access is demanded and the system resources to which the access demand relates in the order listed in the access demand;

matching the access demand against the at least one rule for correspondence between the access type of interest, the user and the system resources in the order stated in the access demand with the identifier, user and system resources in the order stated in the at least one rule; and sending a positive access response for a direct match.

10. The method of claim 9 further comprising the steps of:

if there is no direct match between the access demand and the at least one rule, determining if there is at least one rule which identifies the user as a member of a class of users and, if there is, determining if the class is the user of the at least one rule with which the access type matched that of the access demand;

if the class is not the user, sending a negative access response;

if the class is the user, continuing as though there were a match between the user identified in the access demand and the user in the at least one rule;

if there is a user correspondence, determining if there is a rule which identifies the first through nth system resource in the same position as the position of the first through nth system resource identified in the access demand; and if the resources of the access demand match the resources and positioning in the at least one rule, providing a positive access signal.

13

11. The method of claim 10 further comprising the steps of:

if there is a user match, determining, for any unmatched first through nth resources of the access demand, if a rule exists which defines the unmatched resource as as a member of a group of resources;

determining if the class of resources occupies the position in the at least one rule with which the access type, user and preceding resources match that of the access demand;

if the class does not occupy the resource position, providing a negative access response; and if the class does occupy the resource position, proceeding as though there were a match.

12. The method of claim 9 further comprising the steps of:

validating an access demand from a first user to modify at least one rule;

permitting the first user to access the at least one rule for modification;

prohibiting other access to the at least one rule until the modified at least one rule is updated throughout the computer system;

storing in order requests to access the at least one rule;

determining when modification of the at least one rule by the first user is complete;

upon modification completion, updating the at least one rule in the location within the computer system where the at least one rule is accessed by the first user to reflect the modified at least one rule;

locating every other location in the computer system where the at least one rule resides; and updating the at least one rule in every other location consistent with the modification at the location of access by the first user.

13. A security platform for a UNIX-based system comprising:

at least one rule, each rule directly defining a type of access in terms of subjects, a subject being an entity type for which access is permitted by the rule and which encompasses users, system resources and other entity types, and two or more objects, an object being the entity types to which the access relates in the order listed and which encompass users, system resources and other entity types;

means for comparing requested access, requested access being defined by an access demand which identifies the access type of interest and defines that access type in terms of subject and objects, to the defined at least one rule to determine if requested access is permitted based upon the correspondence between the terms making up the requested access with the terms defining the at least one rule;

wherein the comparing means determines if the access type identified in the access demand is the same as the access type of the at least one rule, and if no match exists, determines that access is not permitted;

but if a match exists between the access demand and the at least one rule, the comparing means determines if the subject of the access demand is the same as the subject of the at least one rule with which the access type matched;

if a match exists between the access demand subject and the subject of the at least one rule with which the access type of the access demand matched, the comparing means determines if the first object of the access demand is the same as the first object of the at least one rule with which the access type and subject matched;

if there exists a match between the first object of the access demand and the first object of the at least one rule, the comparing means continues to attempt to find matches through the nth object of the access demand and the nth object of the at least one rule; and if all n objects for the access type match all n objects in the at least one rule, the comparing means determines that access is permitted;

and wherein the comparing means further determines for any unmatched subject of the access demand if a rule exists within the platform which defines the unmatched subject as a member of a group of subjects, a class, and determines if the class is the subject of the at least one rule with which the access type matched that of the access demand, and if the class is not the subject, determines that access is not permitted, and if the class is the subject, proceeds as though there were a match, and wherein the comparing means also determines for any unmatched object of the access demand if a rule exists within the platform which defines the unmatched object as a member of a group of objects, a class, and determines if the class occupies the object position in the at least one rule with which the access type, subject and preceding objects match that of the access demand and if the class does occupy the object position, proceeds as though there were a match;

and wherein the comparing means determines that access is not permitted if no match exists for the access type, the subject, or an object and determines that access is permitted if a match exists for the access type, the subject and the objects between the access demand and the at least one rule;

means for providing a positive response when access is permitted and a negative response when access is not permitted;

a rules file in which a persistent copy of the at least one rule is kept;

shared memory in which a non-persistent copy of the at least one rule is kept; and wherein the comparing means searches the shared memory for the at least one rule;

means for limiting modification of the platform to properly authorized users including defining the request to modify the platform as an access demand in which the user is identified as the subject of the access demand and the comparing means determines if at least one rule matches the access demand and permits access, the means for limiting modification includes validating a security code;

a daemon process which modifies rules in the shared memory and in the rules file consistent with the input from a properly authorized user; then sends the modifications to any other daemon process in the system; and a message queue which accepts all messages input to the platform related to modification of the platform and which keeps any other user's input from the daemon process until the daemon process has completed modifying rules consistent with the input from the immediate authorized user.

14. A method for limiting access within a computer system to provide security therefor, comprising the steps of:

specifying each type of access of interest by an identifier;

defining, for each type of access of interest, at least one rule which identifies the access type by the identifier and specifies access in terms of users, users being either persons or system resources, for which the access of interest is defined as permitted and two or more system resources to which the access of interest relates in the order listed in the at least one rule;

accepting an access demand sent by a user which identifies the access type of interest, and demands access in terms of the user for which access is demanded and the system resources to which the access demand relates in the order listed in the access demand;

matching the access demand against the at least one rule;

sending a positive access response for a direct match;

if there is no direct match between the access demand and the at least one rule, determining if the at least one rule has an identifier which matches the access type of interest of the access demand;

if there is no match between the at least one rule identifier and the access type of interest of the access demand, sending a negative access response;

if there is a match between the at least one rule identifier and the access type of interest of the access demand, determining if there is a match between the user in the access demand with the user in the at least one rule for which the identifier matched the access type of interest;

if there is no match between the user in the access demand and the user in the at least one rule, determining if the user is a member of a class of users and, if it is, determining if the class is the user of the at least one rule for which the access identifier matched that of the access type of interest in the access demand;

if the class is not the user, sending a negative access response;

if the class is the user, continuing as though there were a match between the user identified in the access demand and the user in the at least one rule;

if there is a user match, determining if the at least one rule in which the identifier and the user matches respectively the access type and user of the access demand identifies the first through nth resources in the same position as the position of the first through nth resources identified in the access demand;

if the resources match, providing a positive access signal;

if there is not a match of the first through n resources between the at least one rule and the access demand, determining for any unmatched first through nth resources of the access demand, if a rule exists which defines the unmatched resource as a member of a class of resources;

determining if the class of resources for the unmatched resource occupies the position in the at least one rule with which the access type, user and preceding resources match that of the access demand;

if the class does not occupy the resource position, providing a negative access response;

if the class does occupy the resource position, proceeding as though there were a match;

sending a negative access response if a resource at the location defined in the access demand is unmatched by a comparable resource in the at least one rule; and sending a positive access response if the access type, user and resources at the location defined in the access demand is matched by a comparable identifier, user, and resources in the at least one rule.

15. The method of claim 14 including the additional steps of:

controlling modification of rules to permit only one authorized user access to a rule at a time;

upon completing a rule modification, providing the modified rule to each place in the system in which the rule is resident and replacing the affected rule with the modified rule;

storing in order all messages from other authorized users and withholding access by any other authorized user until dissemination of the modified rule is complete.

16. The method of claim 15 including the additional steps of:

determining whether a user is authorized access to modify rules, determining access authorization including the steps of:

requesting the user initiating the access demand respond with an security code; and validating the security code provided.

* * * * *